United States Patent [19]

Rhody et al.

[11] 4,183,065
[45] Jan. 8, 1980

[54] VIDEO RECORDING APPARATUS WHICH SAMPLES AND QUANTIZES LOW FREQUENCIES AND THEN GROUPS AND RECORDS AN ANALOG REPRESENTATION THEREOF

[75] Inventors: Harvey E. Rhody, Fairport; Frederic H. Metildi, Penfield; Edward M. Granger, Rochester, all of N.Y.

[73] Assignee: Eastman Kodak Company, Rochester, N.Y.

[21] Appl. No.: 951,424

[22] Filed: Oct. 16, 1978

Related U.S. Application Data

[63] Continuation of Ser. No. 669,923, Mar. 24, 1976, abandoned.

[51] Int. Cl.$^2$ .................. H04N 5/79; H04N 5/795
[52] U.S. Cl. ............................ 360/9; 360/24; 360/27; 360/33; 360/36; 360/37
[58] Field of Search .................... 360/8–10, 360/24, 27, 32–33, 36–37; 358/4, 12, 127, 133, 138, 141, 142, 145–148; 179/15.55 T

[56] References Cited

U.S. PATENT DOCUMENTS

| | | | |
|---|---|---|---|
| 2,850,574 | 9/1958 | Krelzner | 358/133 |
| 3,726,993 | 4/1973 | Lavalee | 358/133 |
| 3,781,463 | 12/1979 | Van den Bussche | 179/15.55 T |

FOREIGN PATENT DOCUMENTS

| | | | |
|---|---|---|---|
| 1242673 | 6/1967 | Fed. Rep. of Germany | 360/33 |
| 1263071 | 3/1968 | Fed. Rep. of Germany | 360/24 |

*Primary Examiner*—Raymond F. Cardillo, Jr.
*Attorney, Agent, or Firm*—Robert F. Cody

[57] ABSTRACT

Apparatus for directly recording television signals on a magnetic medium strips out sync and blanking information. Low frequency components of the television signals are time compressed, i.e. frequency shifted, and recorded as a substitute for the stripped-out sync and blanking information. Thus, high frequency components of each video line are recorded, followed by that line's low frequency components, thereby facilitating the playback of low frequency information. In time compressing the low frequency information, the video signal content of a line is sampled at a predetermined rate. Each sample is then quantized for purposes of improving the playback signal-to-noise ratio, i.e. the effect of tape modulation, and other, noise is nullified by sample quantization. And, to cut the bit rate resulting from sample quantization, a preferred form of the invention groups the quantized bits and records analog representations of the bit groups.

2 Claims, 3 Drawing Figures

VIDEO RECORDING APPARATUS WHICH SAMPLES AND QUANTIZES LOW FREQUENCIES AND THEN GROUPS AND RECORDS AN ANALOG REPRESENTATION THEREOF

CROSS-REFERENCE TO RELATED APPLICATIONS

The following applications are related to each other:
This is a continuation of application Ser. No. 669,923, filed Mar. 24, 1976 now abandoned.

BACKGROUND OF THE INVENTION

1. Field of the Invention

This invention relates to video recorders, especially those which employ magnetic tape as the recording medium, and which, on playback, feed video signals, say, to the input terminals of a television set. The term "recorder" as used herein shall be interpreted to include playback apparatus as well.

2. Description Relative to the Prior Art

As is known, the video spectrum, as typified by the NTSC baseband signal, contains frequency components from DC to 3 MHz or more, the lower frequencies corresponding at least in part to scene background information, and the higher frequencies corresponding to scene detail information. Because the playback of information recorded on a magnetic medium such as magnetic tape is frequency-dependent (i.e. system response to the playback signal is dependent on the rate of change of flux as seen by a playback head), flux patterns which correspond to low frequency signal components are not easy to detect in the magnetic tape. Prior attempts to record and play back, say, the baseband NTSC signal have, therefore, usually involved the baseband-modulation, during recording, of a relatively high frequency carrier. By so using a baseband-modulated carrier, the playback circuits of the recorder can be tuned to respond to the rapidly changing flux characteristics which correspond to the recorded carrier, with the baseband video signal being then relatively easy to detect and remove from the modulated carrier. While the practice of recording a modulated carrier solves the problem associated with the playback of low frequency information, it does so not without cost: First, because a high frequency carrier must be recovered during playback, the gap in the playback head—for a given speed of tape past the playback head—must be narrower than for the case of a directly recorded baseband signal, a factor which usually means higher head cost. And, second, because the baseband signal, when it modulates the carrier during the recording operation, produces signal sidebands—which must be recorded, and recovered during playback—the spectrum of frequencies to be processed by the recorder (i.e. the recorder bandpass requirements) will be wider than in the case of a baseband recorder. Such bandwidth requirements directly affect information packing density; and, thus, for maximum tape economy for a given amount of video information, the prior practice of recording a modulated carrier leaves much to be desired.

As indicated above, playback of magnetically recorded information depends on the rate of change of flux as seen by a magnetic head. This may suggest that—rather than place the baseband video signal on a carrier as a vehicle for playing back low frequency video—the track containing the recorded video information be widened a bit for cooperation with a widened magnetic playback head, the recorded information being the full video baseband signal. In that way, flux-to-head linkage will increase and, attendantly, so will the playback signal-to-noise ratio (SNR)—which should improve the recoverability of low frequency information. But widening the record track works counter to the goal of "high-packing-density tape usage". Besides, low frequencies, when recorded on a magnetic medium, create flux patterns within the medium which tend to spread out and, to assure that the low frequencies recorded in one track are not played back during the playback of an adjacent track, sizable guard bands between the tracks have to be used, again adversely influencing the efficient use of the magnetic medium.

Aside from the above techniques for recovery of low frequency information from a magnetic recording medium, one might also consider separating the low frequency components of the baseband signal from the higher frequency components, and then recording the low frequencies on a carrier in a separate track. But the use of two tracks to record the baseband information obviously is not in the interest of tape efficiency.

In copending application Ser. No. 669,925, filed Mar. 24, 1976 in the name of Edward M. Granger, now U.S. Pat. No. 4,104,683 baseband recording of the NTSC signal is indicated as being implemented by splitting the baseband signal into high and low frequency bands, the low frequency band being then time compressed and recorded analog-wise as a substitute for the sync and blanking information contained in the NTSC signal. Such a technique will work well so long as tape and other noise is relatively low, for low frequency SNR is extremely critical in the faithful reproduction of recorded scene information.

SUMMARY OF THE INVENTION

To immunize, from noise, the baseband recording of time compressed low frequency information which is substituted for sync and blanking information during the recording process, the present invention proposes, prior to recording, the quantization of such low frequency information; and, to cut the quantization bit rate which would have to be handled during the sync and blanking period, the invention further proposes the grouping, according to a predetermined sequence, of the quantization bits, followed by a reconversion and recording of the grouped bits as analog signals.

The invention will be described with reference to the figures, of which:

Figure 1:
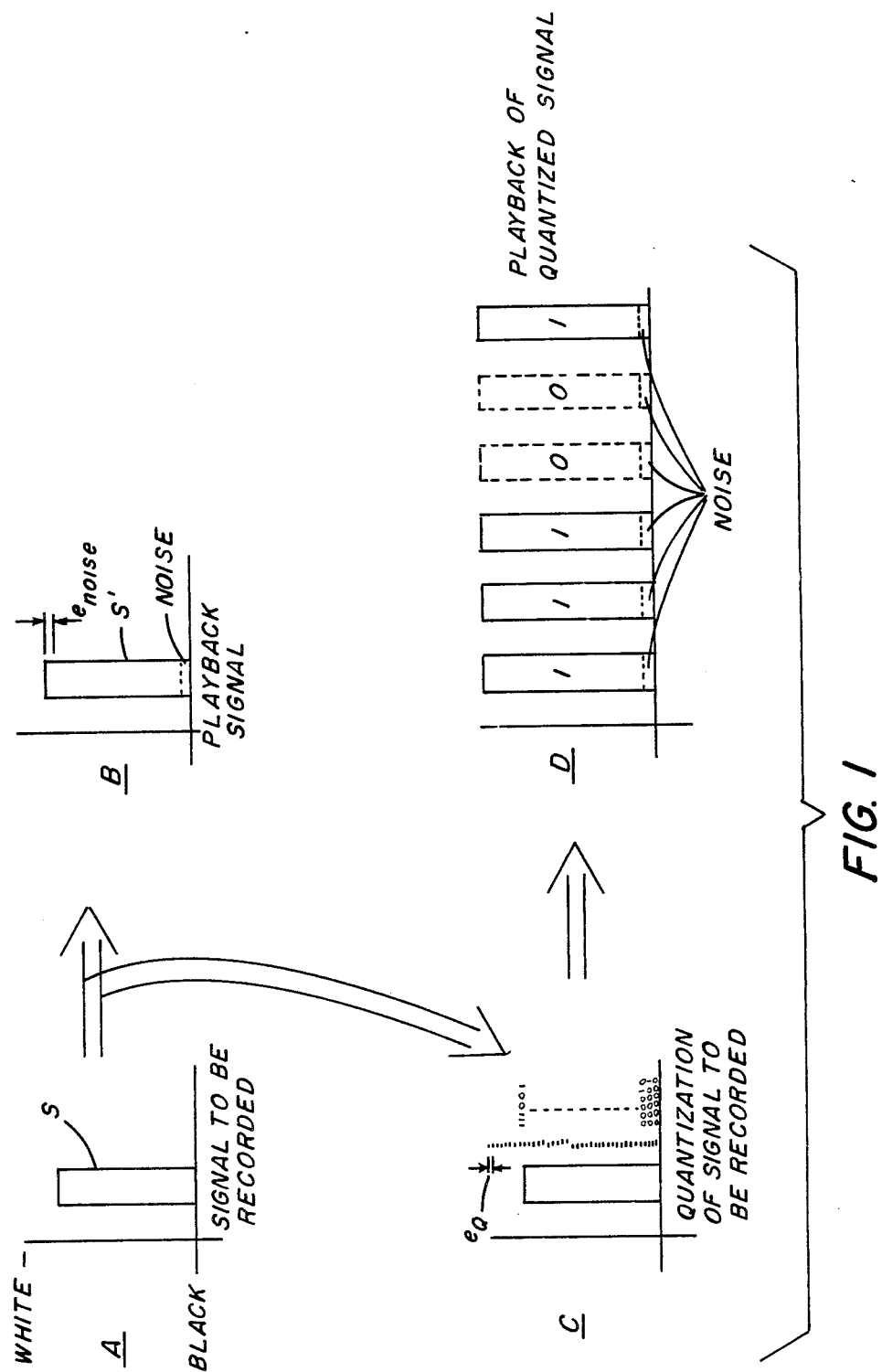
FIG. 1 is a series of diagrams useful in explaining the invention.

As indicated above, low frequency SNR is critical to the high quality display of recorded video information. To enable a relaxation in the noise figure for the Granger recorder (U.S. application Ser. No. 669,925), and its tape, the invention proposes quantization of the low frequency information which gets substituted for sync and blanking information. How and why quantization relaxes the low frequency noise requirements of the Granger recorder may be appreciated from a consideration of FIG. 1: Consider the low frequency signal sample S of FIG. 1A which is to be recorded on magnetic tape. Assuming tape noise as depicted in FIG. 1B, it is apparent that, during playback of the Granger recorder, close reproduction, as is so necessary, of the recorded low frequency sample may be difficult. By quantizing the low frequency sample (FIG. 1C), the maximum error that the playback signal will experience (assuming no loss of bit information) will be the relatively small error $e_Q$. (The error $e_Q$ will vary directly according to the number of quantization bits employed.) Rather than require a playback system to discern signal amplitudes (as in FIG. 1B), FIG. 1D, which is representative of a principal teaching of the invention, indicates that, even in the presence of noise, the presence or absence of a quantization bit is relatively easy to determine; and thus low frequency noise can be effectively filtered away, during playback, by quantizing the low frequency samples.

Figure 2:
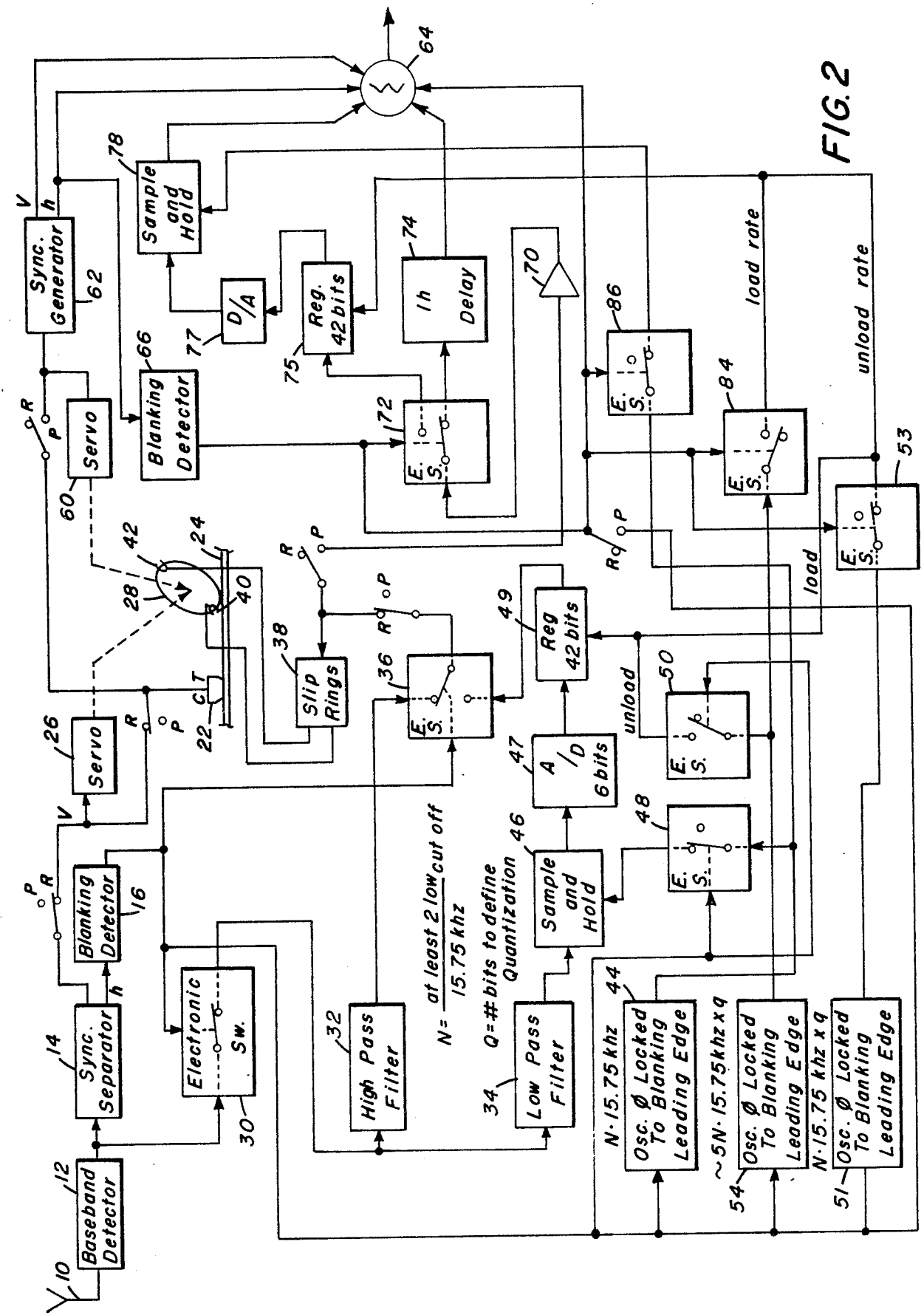
FIG. 2 is a block diagram of one embodiment of the invention.

Referring to FIG. 2, a video recorder, embracing both the teaching of U.S. application Ser. No. 669,925 and the teaching of the present invention, receives a television signal off an antenna 10 and detects the information or baseband part of that signal by means of a detector 12. A circuit 14, for removing the sync information contained in the output of the baseband detector 12, applies its horizontal sync output h to a circuit 16 adapted to produce a signal corresponding to the duration of the blanking signal on which the sync signal rides. The blanking detector 16, typically, will include a counter, a particular count of which is kept in sync with an edge of the sync pulse, and which counter is reset when its count reaches a count corresponding to the duration of the blanking period. The vertical sync pulse output v from the sync separator 14 is applied via a RECORD-PLAYBACK switch to a magnetic head 22 for laying down a control track on magnetic tape 24. In addition, the vertical sync pulse v is applied to a servo 26 which slaves the speed of a head wheel 28 to the vertical sync pulse rate.

The video information contained in the output of the baseband detector 12, as taught in U.S. application Ser. No. 669,925, is applied via an electronic switch 30 to high and low pass filters 32, 34, respectively, the switch 30 being actuated (opened) at the horizontal sync rate by the output of the blanking detector 16. The high frequency content of the baseband signal is applied via an electronic switch 36, and slip rings 38, to magnetic heads 40, 42 which cooperate with and scan the tape 24 in a well-known manner.

At the same time that the high frequency content of the baseband signal is recorded, the low frequency content of the baseband signal is processed for recording as a replacement for the sync and blanking information eliminated by actuation of the switch 30. Briefly, the low frequency output of the filter 34 is sampled at a first rate and quantized; then, during a period that corresponds with the horizontal blanking portion of the baseband signal, the quantized low frequency samples are clocked at a relatively high rate onto the tape 24. Assuming the low frequency band extends from DC to 40 KHz, in order to meet the Nyquist criterion and thus avoid aliasing effects, the sampling of low frequency information must be such that the number of samples N taken across a horizontal line of low frequency video information times the horizontal line rate equals at least twice the upper frequency edge (i.e. two times 40 KHz equals 80 KHz) of the low frequency band. And, in this regard, seven samples of low frequency information have been found adequate, an oscillator 44 being operated at seven times the line rate of 15.75 KHz to effect such sampling by a sample-and-hold circuit 46. The sampling oscillator 44 applies its sampling signals to the sample-and-hold circuit 46 via an electronic switch 48 during the occurence of each line of low frequency information. As soon as a low frequency sample is taken, it is immediately quantized (six bits) by an analog-to-digital converter 47 (A/D) and loaded, in bit form, into a register 49 by means of an oscillator 51 and switch 53. Then, the next sample is similarly taken, quantized, and loaded into the register 49 as the first sample progresses down the register, etc. After the seventh sample is taken, and quantized, the blanking signal occurs, opening the switches 48 and 53, and closing a switch 50. As the switch 50 closes, an oscillator 54 clocks the 42 bits of low frequency information to the tape 24. Since the blanking signal has a duration which is about one-fifth the duration of a horizontal scan line, and since each sample is represented by q bits (where q equals six), the oscillator 54 has a frequency at least about 5q times that of the oscillator 44. In other words, while low frequency samples are slowly taken over the course of a horizontal line, they—as represented by 42 bits within the register 49—are quickly clocked onto the tape during the relatively brief blanking period, and thus appear as an easily recoverable high frequency bit rate, at least as far as head-to-tape interaction is concerned.

During playback, reverse signal processing is employed: A servo 60 (which obviously may be the servo 26 operated through suitable switching) drives the head wheel 28 under control of the control track head 22; and vertical and horizontal sync pulses are produced by a sync pulse generator 62 responsive to the control track information (head 22), the sync pulses being applied to a summing circuit 64 adapted to reconstruct the baseband signal. A blanking detector 66 like the detector 16 (or, with suitable switching, the same one) produces switching signals for use in gating the playback information to either of two processing channels. The playback information—comprising, in sequence, a band of high frequency signals occurring over a 1-h duration, followed by 42 bits of low frequency information occurring over a "blanking" duration, followed by a band of high frequency signals occurring over a 1-h duration, followed by 42 bits of low frequency information occurring over a "blanking" duration, etc.—is applied via slip rings 38, and playback amplifier 70, to an electronic switch 72. The switch 72 is actuated by the playback blanking signal (circuit 66) and steers the playback information as follows: the high frequency information is applied to a 1-h delay 74 which lets the low frequency information—corresponding to such high frequency information, and recorded timewise on the tape after the high frequency information—to catch up in time with the high frequency information; and the low frequency information, which was quantized and time compressed for recording during the blanking period, is, during the playback blanking period, loaded quickly into a register 75 by use of the high frequency oscillator 54 (switch 84). Then, by use of the oscillator 51, and switch 53, the register 75 is unloaded as the high frequency information progressively appears at the output of the 1-h delay 74. As the bits corresponding to the successive low frequency samples are clocked out of the register 75, they are converted to analog form (D/A 77), and held in a sample-and-hold circuit 78—the circuit 78 under control of the oscillator 44, and switch 86, applying its samples to the summing circuit 64 in proper phase with the high frequency signal information with which such samples correlate. With the high and low frequency information, and the sync and blanking information, all appearing at the summing circuit 64 in proper time, the circuit 64 produces a baseband signal which may, for example, be modulated on a carrier and played through a television receiver.

Not only to stabilize system timing, but also to avoid introducing unwanted modulation of the processed low frequency information, the oscillators 44, 51, and 54 are all phase-locked to sync information, either the sync information derived off the air, or the sync information derived off the tape.

To be realized is that in the apparatus as described above, bits—and not signal amplitudes—are processed while practicing the invention, "bit-rate variation" being the vehicle for time compressing the low frequency information, whereby such information may be used as a substitute for sync and blanking information. Since bits can be saturation-recorded, their occurrence, or not, is all that has to be detected, during playback, thus effectively nullifying the influence of low frequency noise.

In practicing the invention as taught in connection with the apparatus of FIG. 2, the bit rate—assuming seven six-bit samples for each horizontal line of video—will be approximately 3.5 megabits per second. Such a bit rate may, depending on system design, be too high to process effectively. By means of the invention in its presently preferred form, the bit rate is effectively reduced by a bit-grouping technique, typically by pairing bits and converting each bit-pair to one of four representative analog levels. The analog levels are then recorded; and during playback, such levels are decoded into bit-pairs, converted to six-bit groups, and then each six-bit grouping is converted to one of seven low frequency analog samples.

Figure 3:
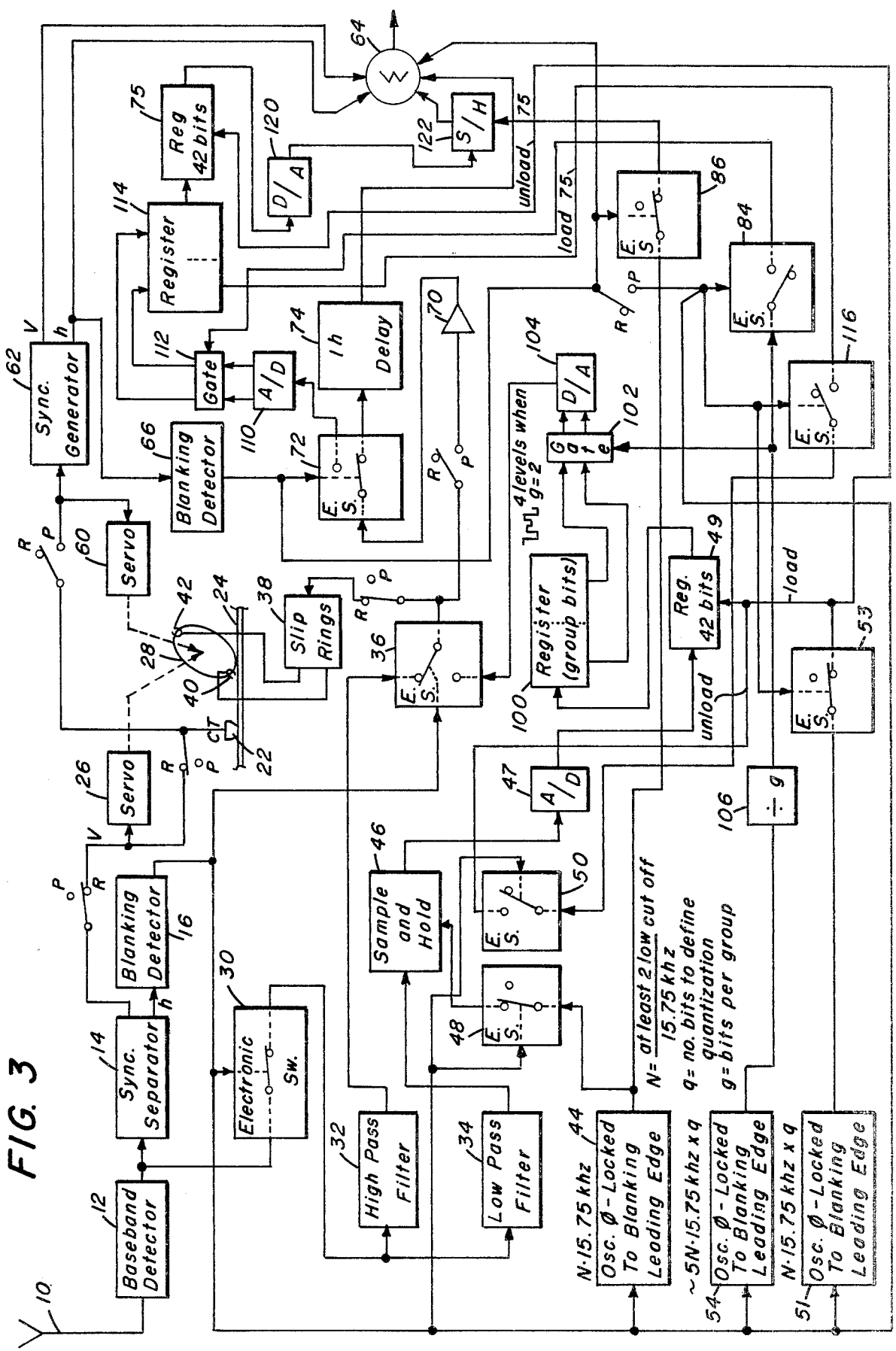
FIG. 3 is a block diagram of another embodiment of the invention.

FIG. 3 shows a system employing the concepts embodied in the apparatus of FIG. 2 as modified by the bit-grouping technique: Save for the addition of certain signal processing hardware, the system of FIG. 3 is largely the same as the system of FIG. 2. Thus, the description which follows will only address the FIG. 2 components as they relate to the bit-grouping concept:

During recording, as sample bits emerge at a high rate from the register 49 in response to a blanking signal applied to the switch 50 (the blanking signal allowing the high frequency oscillator 54 to apply its output to the register 49) they (i.e. the bits) are applied serially to a two-bit register 100 which serves as a "bit-grouper". After each successive pair of bits is briefly stored in the register 100, it (i.e. the bit-pair) is gated (102) to a digital-to-analog converter 104 (D/A). Such gating is under control of a clock that is one-half the frequency of the oscillator 54 output, a frequency divider 106 (the divisor g of which is "two" in the case at hand) providing the gating signal which is applied to the gate 102. The D/A converter 104 output, which appears as a four-level analog signal, is then applied (either on a carrier or not) as a substitute for sync and blanking information, via the switch 36, to and recorded on the tape 54. Thus, while digital processing is employed to modify the effect of noise on low frequency sample information to be recorded as replacement for sync and blanking information, the substitute signal information which is actually recorded, as in FIG. 3, appears as a signal corresponding to a bit-rate that is only one-half the bit-rate employed in connection with the apparatus of FIG. 2.

During playback, some smoothing of the four-level analog signal occurs. See the playback signal appearing at the input to the amplifier 70. In response to the playback blanking signal (66), the four-level analog signal is applied via the switch 72 to an analog-to-digital converter 110 (A/D), the digital output of which is gated (112), parallel-wise, by the frequency divider 106 output into a two-bit register 114. At twice the frequency of the frequency divider 106 output, i.e. in response to the high frequency oscillator 54 output applied via a switch 116, the contents of the register 114 are serially loaded into the register 75. During the playback blanking period, the low frequency information, in digital form, is stored in the register 75, and readied for conversion to analog form for complementing the high frequency video information as it appears at the output of the delay 74. To this end, a six-bit digital-to-analog converter 120 (D/A) receives the register 75 output as it is relatively slowly clocked out (switch 53) during the non-blanking part of each line of playback video information. As the last bit in each succession of six bits is applied to the D/A converter 120, a sample-and-hold circuit 122, cooperative with the D/A converter 120, has its six-bit "held" signal clocked (the switch 86 being closed) to the summing circuit 64 in proper phase with the high frequency information applied to the switch 64 by the delay 74.

The invention has been described in detail with particular reference to preferred embodiments thereof, but it will be understood that variations and modifications can be effected within the spirit and scope of the invention.

What is claimed is:

1. Apparatus for recording a television signal comprising:
    (a) means for dividing said signal into high and low frequency bands;
    (b) means for receiving said low frequency band for time compressing said low frequency band;
    (c) means for recording on a magnetic medium first said high frequency band and then said time compressed low frequency band;
said means for time compressing said low frequency band comprising:
    (a) means for sampling said low frequency band at a predetermined rate;
    (b) means for quantizing said signals;
    (c) means for grouping the bits which comprise said quantized samples;
    (d) means for converting said grouped bits to analog representations of said grouped bits; and
    (e) means for applying said analog representations of said grouped bits to said magnetic medium.

2. Signal processing apparatus for use in recording a television signal comprising:
    (a) high and low pass filter means adapted to receive said signal;
    (b) means for sampling the output of said low pass filter means;
    (c) means for quantizing the sampled output of said low pass filter means;
    (d) means for grouping the bits which comprise said quantized samples;
    (e) means for converting said grouped bits to analog representations thereof;
    (f) means for recording on a magnetic medium the signal output of said high pass filter means followed by the analog representations of said grouped bits;

(g) means for playing back signal information from a magnetic medium;

(h) means for re-converting analog representations of said grouped bits to their quantized equivalents;

(i) means for forming analog signal samples from the bit output of said means for re-converting; and (j) means for combining played back high pass signal information with the analog signal output of said means for re-converting.

* * * * *